US011781956B2

United States Patent
Ma et al.

(10) Patent No.: US 11,781,956 B2
(45) Date of Patent: Oct. 10, 2023

(54) OBSERVABLE MICRO-NANO MECHANICAL TESTING APPARATUS AND METHOD

(71) Applicant: Xiangtan University, Xiangtan (CN)

(72) Inventors: Zengsheng Ma, Xiangtan (CN); Kun Sun, Xiangtan (CN); Yichun Zhou, Xiangtan (CN)

(73) Assignee: Xiangtan University, Xiangtan (CN)

( * ) Notice: Subject to any disclaimer, the term of this patent is extended or adjusted under 35 U.S.C. 154(b) by 328 days.

(21) Appl. No.: 17/205,197

(22) Filed: Mar. 18, 2021

(65) Prior Publication Data

US 2022/0205887 A1 Jun. 30, 2022

(30) Foreign Application Priority Data

Dec. 29, 2020 (CN) .......................... 202011586567.3

(51) Int. Cl.
*G01N 3/06* (2006.01)
*G01N 3/42* (2006.01)

(52) U.S. Cl.
CPC .............. *G01N 3/068* (2013.01); *G01N 3/42* (2013.01)

(58) Field of Classification Search
CPC ... G01N 3/068; G01N 3/42; G01N 2203/0078
See application file for complete search history.

(56) References Cited

U.S. PATENT DOCUMENTS

| 8,959,980 B2 * | 2/2015 | Vodnick | G01P 21/00 73/1.89 |
| 2011/0032511 A1 * | 2/2011 | Luttge | G01B 11/161 356/35.5 |
| 2016/0282249 A1 * | 9/2016 | Leroux | G01N 3/02 |
| 2016/0334315 A1 * | 11/2016 | Leroux | G01N 3/46 |

FOREIGN PATENT DOCUMENTS

| CN | 105973694 A | * | 9/2016 | ............... G01N 3/02 |
| CN | 208297279 U | * | 12/2018 | ............... G01N 3/42 |
| CN | 110044753 A | * | 7/2019 | |

* cited by examiner

*Primary Examiner* — Octavia Davis Hollington
(74) *Attorney, Agent, or Firm* — HOFFMANN AND BARON, LLP

(57) ABSTRACT

An observable micro-nano mechanical testing apparatus and an observable micro-nano mechanical testing method are provided. The apparatus includes a supporting component, a driving component, a bearing component and an imaging component. The driving component and the imaging component are respectively vertically arranged on the supporting component, the bearing component is horizontally arranged on the supporting component and positioned below the driving component and the imaging component, the bearing component is used for bearing a sample and moving the sample, the driving component is used for driving an indenter to apply loads on the sample so as to form an indentation on the sample, and the imaging component is used for observing and analyzing the indentation on the sample.

14 Claims, 9 Drawing Sheets

OBSERVABLE MICRO-NANO MECHANICAL TESTING APPARATUS AND METHOD

CROSS REFERENCE TO RELATED APPLICATIONS

This application claims priority to Chinese Patent Application No. 202011586567.3, entitled "OBSERVABLE MICRO-NANO MECHANICAL TESTING APPARATUS AND METHOD," filed on Dec. 29, 2020, the disclosure of which is incorporated herein by reference in its entirety for all purposes.

TECHNICAL FIELD

The present disclosure relates to the technical field of precision scientific instruments, and particularly relates to an observable micro-nano mechanical testing apparatus and method.

BACKGROUND

With the development of science and technology, indentation tests under microscopic scale of materials have gradually become standard tests for researching mechanical properties of the materials, and are widely applied to the fields such as material surface engineering, microelectronic devices, metal ceramic testing, semiconductor research and development, bioengineering and medical materials. Compared with the traditional mechanical property testing means, micro indentation tests have significant characteristics of operation simplicity, sample preparation simplicity, testing content richness, micro damage and the like, and have been widely applied to testing the properties of the materials, such as hardness, modulus, stress-strain curves, fracture toughness and creep relaxation. Therefore, researching observable micro-nano mechanical testing apparatus to provide effective methods and instruments for testing the mechanical property parameters of the materials is a direction that urgently needs to be solved.

SUMMARY

A purpose of some embodiments is to provide an observable micro-nano mechanical testing apparatus and method, for solving problems existing in the prior art and effectively measuring mechanical property parameters of materials.

To achieve the above purpose, solutions of the present disclosure provide an observable micro-nano mechanical testing apparatus. The apparatus includes a supporting component, a driving component, a bearing component and an imaging component. The driving component and the imaging component are respectively vertically arranged on the supporting component; the bearing component is horizontally arranged on the supporting component and positioned below the driving component and the imaging component; the bearing component is used for bearing a sample and moving the sample; the driving component is used for driving an indenter to apply loads on the sample so as to form an indentation on the sample; and the imaging component is used for observing and analyzing the indentation on the sample.

Optionally, the supporting component includes a supporting bottom plate and a supporting backboard. The supporting bottom plate is horizontally arranged, the supporting backboard is fixedly vertically arranged on one side of a top of the supporting bottom plate. The driving component and the imaging component are arranged on the supporting backboard, and the bearing component is arranged on the supporting bottom plate.

Optionally, the bearing component includes an X-axis precise sliding table, a slide block is horizontally and slidably arranged on the X-axis precise sliding table, an adapter plate is fixedly mounted on a top of the slide block, a clamping table is fixedly connected to a top of the adapter plate and is used for clamping the sample, and a bottom of the X-axis precise sliding table is fixedly arranged on the supporting bottom plate.

Optionally, the driving component includes a supporting module, a precise press-down apparatus, a load detection module and a displacement detection module, the supporting module includes a cantilever beam and a grating fixing rack, the grating fixing rack is fixedly mounted on a lower part of the cantilever beam horizontally arranged, the precise press-down apparatus is fixedly connected to the cantilever beam, and an output shaft of the precise press-down apparatus is vertically arranged downwards, the load detection module is fixedly and threadedly connected with a lower end of the output shaft of the precise press-down apparatus, the displacement detection module is fixedly connected to the grating fixing rack, a lower end of the load detection module is fixedly connected with an indenter fixture, the indenter fixture is used for fixedly mounting an indenter, and one end of the cantilever beam is fixedly connected with the supporting backboard.

Optionally, the imaging component includes a microscope, a microscope stand and a Z-axis sliding table, the microscope is fixed on a top of the microscope stand by set screws, one side of a bottom of the microscope stand is fixed on the Z-axis sliding table by bolts, and the Z-axis sliding table is fixed on the supporting backboard by bolts.

Optionally, the precise press-down apparatus is a linear stepping motor and fixedly connected to the cantilever beam by bolts, the load detection module is a force sensor, a top of the force sensor is connected with the precise press-down apparatus by an adapter, a bottom of the force sensor is connected with the indenter fixture, the displacement detection module includes a grating ruler and a grating reading head, slotted holes are formed in the grating fixing rack, the grating reading head is fixedly connected to the slotted holes of the grating fixing rack by bolts, the grating ruler is adhered to the indenter fixture, and the grating ruler and the grating reading head are arranged opposite to each other, and the grating ruler is parallel to the grating reading head.

Optionally, the microscope includes an objective lens, a point light source, a lens barrel and a camera, the objective lens is of a turret structure, an upper part of the lens barrel is connected with the camera by threads, a lower part of the lens barrel is connected with the objective lens by threads, the lower part of the lens barrel is connected with the point light source by set screws, a middle part of the lens barrel is fixed on the microscope stand by set screws, and the camera can directly transmit an image formed by the objective lens to a control system for conducting real-time observation.

The present disclosure further provides a micro-nano mechanical testing method using the above observable micro-nano mechanical testing apparatus. The testing method includes the following steps:

connecting the precise press-down apparatus with a computer; electrically connecting the load detection module and the displacement detection module with an analog-digital converter based acquisition card; electrically connecting the analog-digital converter based acquisition card with the computer; and electrically connecting the X-axis precise sliding table, the Z-axis precise sliding table and the microscope with the computer;

mounting an indenter on the indenter fixture; fixing the sample on the bearing component; and driving the X-axis precise sliding table by the computer to locate the sample directly under the indenter;

setting parameters of the sample to be tested and the indenter by the computer; selecting a test loading mode; inputting a loading time, a load maintaining time and a unloading time; and starting an indentation test;

determining that the indenter is contacted with the sample when the load detection module detects a minimum response force value of a response force during pressing the indenter, and implementing the indentation test according to predetermined control parameters and the loading time, the load maintaining time and the unloading time;

acquiring load and displacement signals during the indentation test by the analog-digital converter based acquisition card; converting the load and displacement signals into load and displacement values; and presenting the load and displacement values on a computer software interface so as to obtain load-displacement curves in the test process, wherein the load-displacement curves include a load-displacement curve in a loading process and a load-displacement curve in an unloading process; and controlling the X-axis precise sliding table by the computer to move the sample to a position under the microscope; controlling the Z-axis precise sliding table by the computer to transfer the microscope to a focus; starting to observe the sample; and transmitting data observed to the computer.

Optionally, in the acquiring step, a loading segment and an unloading segment in the load-displacement curve are represented by two fitting expressions (1) and (2):

$$P = Ch^2 \qquad (1)$$

$$P = B(h - h_p)^m \qquad (2)$$

In the expressions (1) and (2), P is an indentation load; C, B and m all are fitted values; and a contact stiffness of a material of the sample is a slope of the indentation while a maximum load is reached, and is expressed as:

$$S = \left(\frac{dP}{dh}\right)_{P_{max}} = mB(h - h_p)^{m-1} \qquad (3)$$

Contact depth $h_c$ of the material can be used for calculating a contact area of the indenter which is expressed as follows:

$$h_c = h_{max} - \varepsilon \frac{P_{max}}{S} \qquad (4)$$

In expression (4), $\varepsilon$ is a shape factor of the indenter; a hardness is a parameter of the material which represents an ability of the material to resist a pressing from a hard object, and is expressed as follows:

$$H = \frac{P_{max}}{A_c} \qquad (5)$$

In expression (5), $A_c$ is an actual contact area of the indenter, which is expressed as:

$$A(h_c) = \sum_{i=0}^{n} C_i h_c^{\frac{1}{2^{i-1}}}, \qquad (6)$$

where $C_i$ is a fitting parameter.

In order to calculate elasticity modulus of the material, a relationship between a contact projection area of the indenters and the contact stiffness of the material is introduced:

$$S = \beta \frac{2}{\sqrt{\pi}} E_r \sqrt{A_c} \qquad (7)$$

In expression (7), $\beta$ is a morphology parameter of the indenter; $E_r$ is converted modulus, and the converted modulus is determined by the elasticity modulus and a Poisson's ratio of the material and an elasticity modulus and a Poisson's ratio of the indenter:

$$\frac{1}{E_r} = \frac{1 - v^2}{E} + \frac{v_i^2}{E_i} \qquad (8)$$

In expression (8), E is the elasticity modulus of the material tested; v is the Poisson's ratio of the material tested; $E_i$ is the elasticity modulus of the indenter; $v_i$ is the Poisson's ratio of the indenter; and the elasticity modulus of the material tested is obtained by the expression (8), and is expressed:

$$E = \frac{1 - v^2}{\frac{1}{E_r} - \frac{1 - v_i^2}{E_i}} \qquad (10)$$

thereby, the hardness and the elasticity modulus of the material is obtained.

Optionally, in the observing step, a fracture half-length c of a thin-film material is recorded, and residual stress and fracture toughness of the thin-film material is calculated as follows:

$$K_{IC}^{sur} = K_P + K_r = X \frac{P}{c^{3/2}} + \frac{4}{\sqrt{\pi}} \sigma_r h_t^{1/2} - \frac{2}{\sqrt{\pi}} \sigma_r h_t / c^{1/2} \qquad (11)$$

In expression (11), $K_{IC}^{sur}$ represents surface fracture toughness with an unit of GPa $\sqrt{\mu m}$, $\sigma_r$ represents residual stress with an unit of GPa, P represents indentation load with an unit of mN; c represents fracture half-length with an unit of μm; $h_t$ represents thickness of the thin-film material with an unit of μm; $K_p$ represents a stress intensity factor at the time of loading the indenter; $K_r$ represents a residual stress at the time of unloading the indenter; and $\chi$ represents a constant related to properties of the indenter and thin-film material.

Through deforming of the expression (11), following expression is obtained:

$$\frac{P}{c^{3/2}} = \frac{K_{IC}^{sur} - \frac{4}{\sqrt{\pi}} \sigma_r h_t^{1/2}}{X} + \frac{2}{X\sqrt{\pi}} \sigma_r h_t c^{-1/2} \qquad (12)$$

By considering $$\frac{P}{c^{3/2}}$$

as a function of $c^{-1/2}$, slope and intercept of the expression (12) are obtained by a linear fitting method. In the expression (12), $$X = \delta\left(\frac{E}{H}\right)^{1/2},$$

where $\delta$ is a parameter related to a geometrical shape of the indenter, E and H are respectively Young modulus and hardness of the thin-film material, $$\left(K_{IC}^{sur} - \frac{4}{\sqrt{\pi}}\sigma_r h_t^{1/2}\right)/X$$

is the intercept of the expression (12), $$\frac{2}{\sqrt{\pi}X}\sigma_r h_t$$

is the slope of the expression (12); and when the thickness of the thin-film material is known, the residual stress of the material is obtained by the slope, and the residual stress is substituted into the intercept so as to obtain a surface fracture toughness of the thin-film material;

$$K_{IC}^{int} = \tag{13}$$
$$K_P + K_r = X\frac{P}{c^{3/2}} + \frac{4}{\sqrt{\pi}}\sigma_r c^{1/2} - \frac{2}{\sqrt{\pi}}\sigma_r c^{\frac{1}{2}} = X\frac{P}{c^{3/2}} + \frac{2}{\sqrt{\pi}}\sigma_r c^{1/2}$$

In expression (13), $K_{IC}^{int}$ represents an interfacial fracture toughness, with an unit of GPa $\sqrt{\mu m}$, $\sigma_r$ represents the residual stress with the unit of GPa; P represents the indentation load with the unit of mN; c represents the fracture half-length with the unit of μm; and $\chi$ represents the constant related to the properties of the indenter and the thin-film material.

Through conversion, an expression is obtained as follows:

$$\frac{P}{c^{3/2}} = \frac{K_{IC}^{int}}{X} - \frac{2\sigma_r}{\sqrt{\pi}X}c^{1/2} \tag{14}$$

By considering $$\frac{P}{c^{3/2}}$$

as a function of $c^{1/2}$, slope and intercept of the expression (14) are obtained by a linear fitting method. In the expression (14), $$X = \delta\left(\frac{E}{H}\right)^{1/2},$$

where $\delta$ is a parameter related to the geometrical shape of the indenter; E and H are respectively the Young modulus and the hardness of the thin-film material;

$$\frac{K_{IC}^{int}}{X}$$

is the intercept of the linear fitting equation;

$$\frac{2\sigma_r}{\sqrt{\pi}X}$$

is the slope of the expression (14); and the residual stress and the interfacial fracture toughness can be is obtained.

The present disclosure achieves technical effects as follows:

The apparatus of the present disclosure is simple in overall structure and high in measurement result accuracy. The driving component is used for driving the indenter to apply a load to the sample so as to form indentation. The bearing component is used for bearing and moving the sample. The imaging component is used for observing the indentation on the sample and analyzing the indentation so as to obtain various mechanical parameters. Through overall cooperation, operations of moving the sample, loading to form the indentation and conducting observation and analysis can be realized without transferring the sample. Thus, working efficiency is high. The slotted holes are formed in the grating fixing rack, the grating fixing rack is in threaded connection with the grating reading head by bolts penetrating through the slotted holes. The distance between the grating reading head and the grating ruler is conveniently adjusted, and an observable range is wide. The objective lens is of the turret structure and can conduct observation under different magnification, thereby realizing both high-magnification and large-view. The image formed by the objective lens can be directly transmitted to the computer by the camera so as to conduct real-time observation.

BRIEF DESCRIPTION OF THE DRAWINGS

To clearly describe technical solutions in embodiments of the present disclosure or in the prior art, drawings to be used in the embodiments are briefly introduced below. Apparently, the drawings described herein are merely some embodiments in the present disclosure. Other drawings may be obtained by those ordinary skilled in the art without making creative labor according to the drawings.

Figure 1:
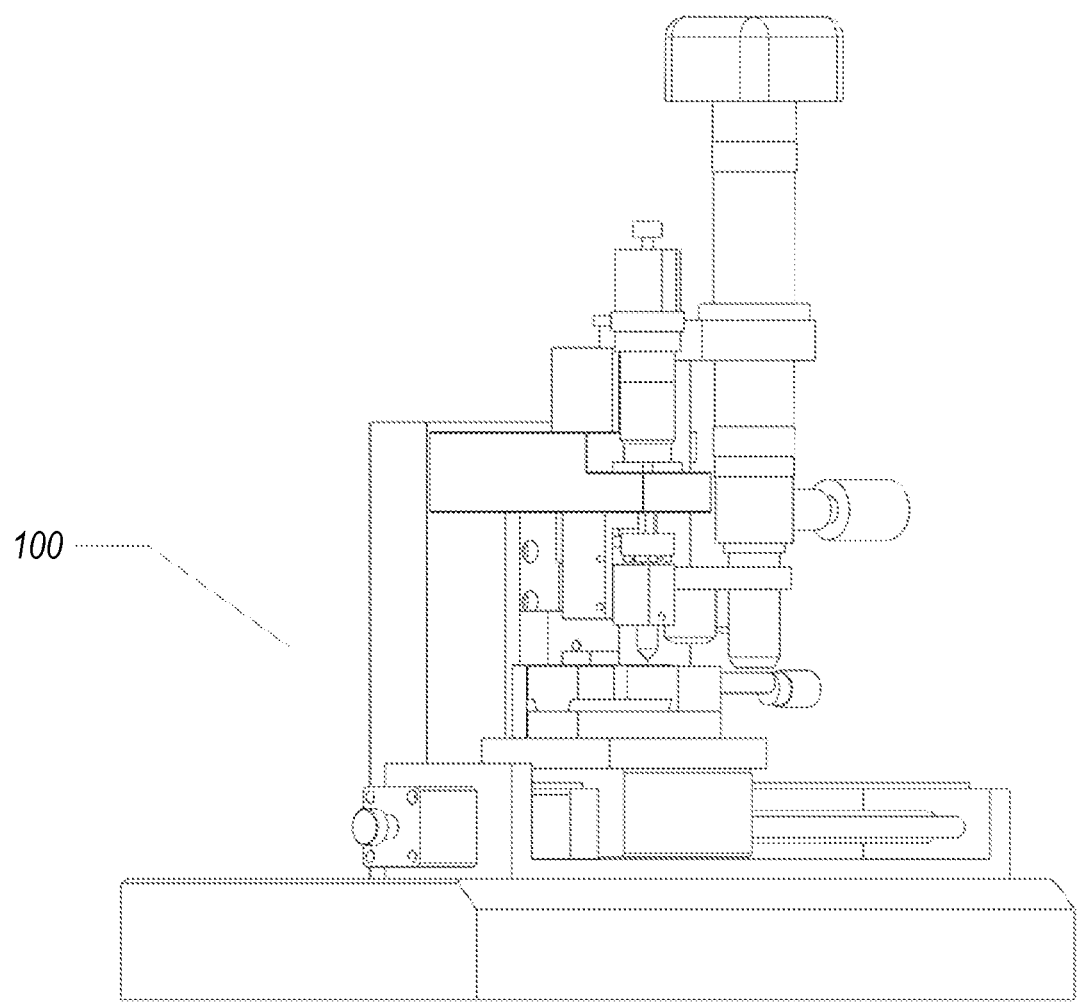
FIG. 1 is a front view of an observable micro-nano mechanical testing apparatus.
Figure 2:
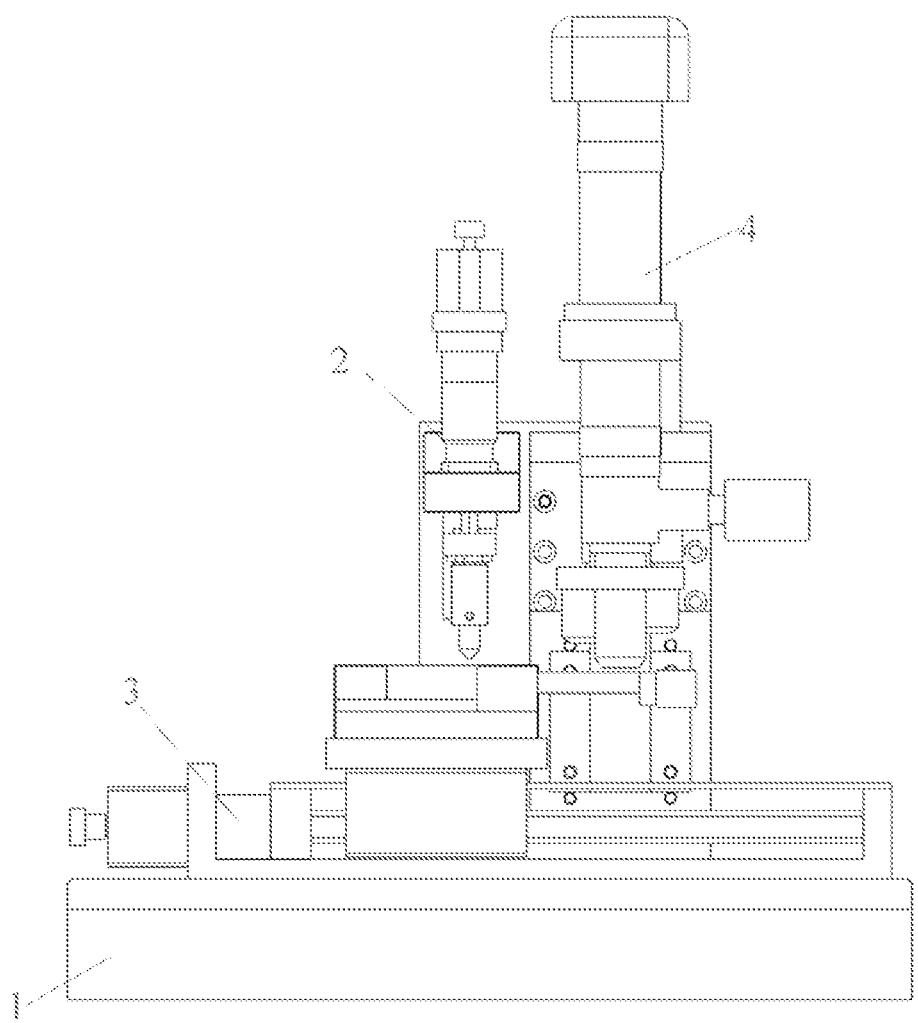
FIG. 2 is an isometric view of the observable micro-nano mechanical testing apparatus.
Figure 3:
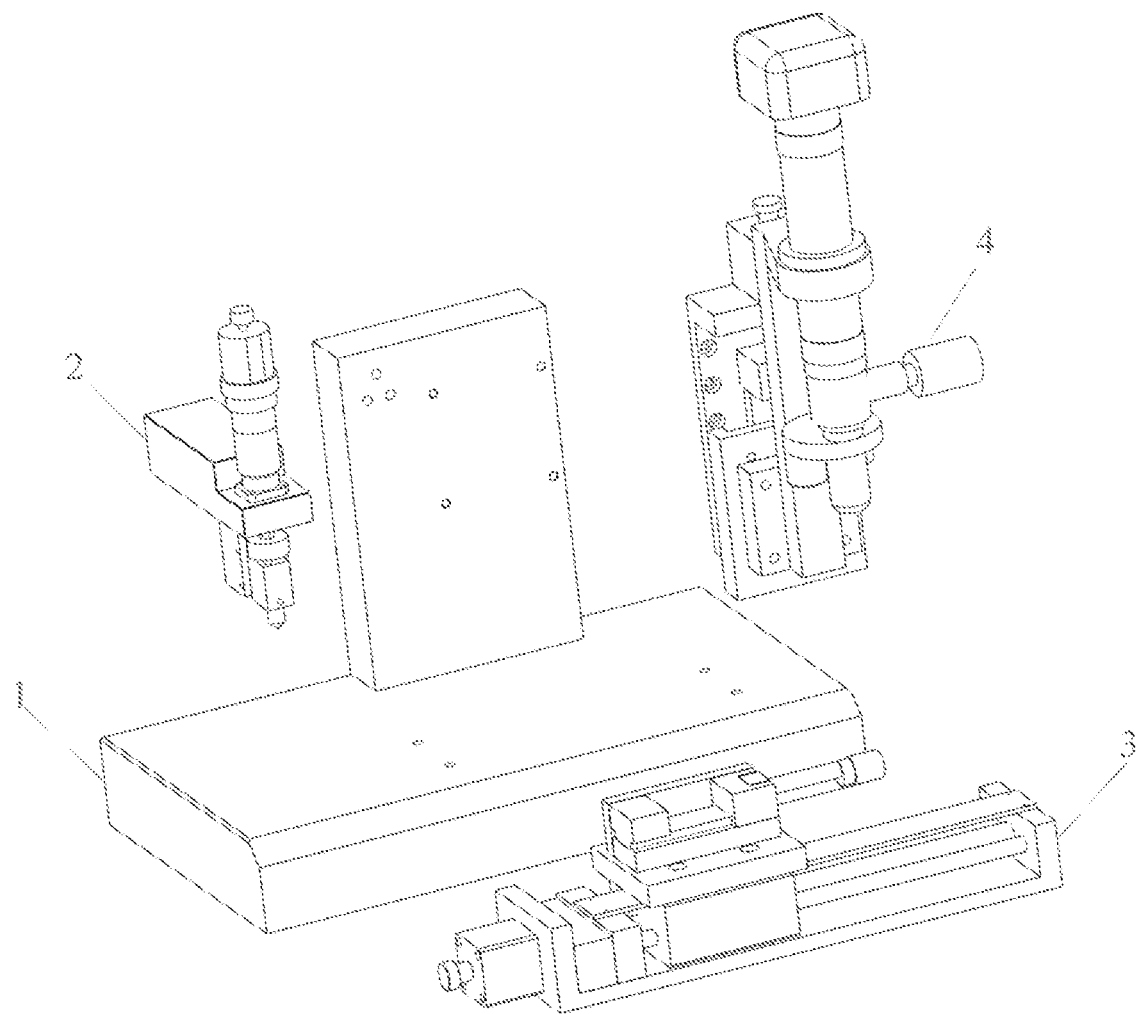
FIG. 3 is a basic structural diagram of the observable micro-nano mechanical testing apparatus.
Figure 4:
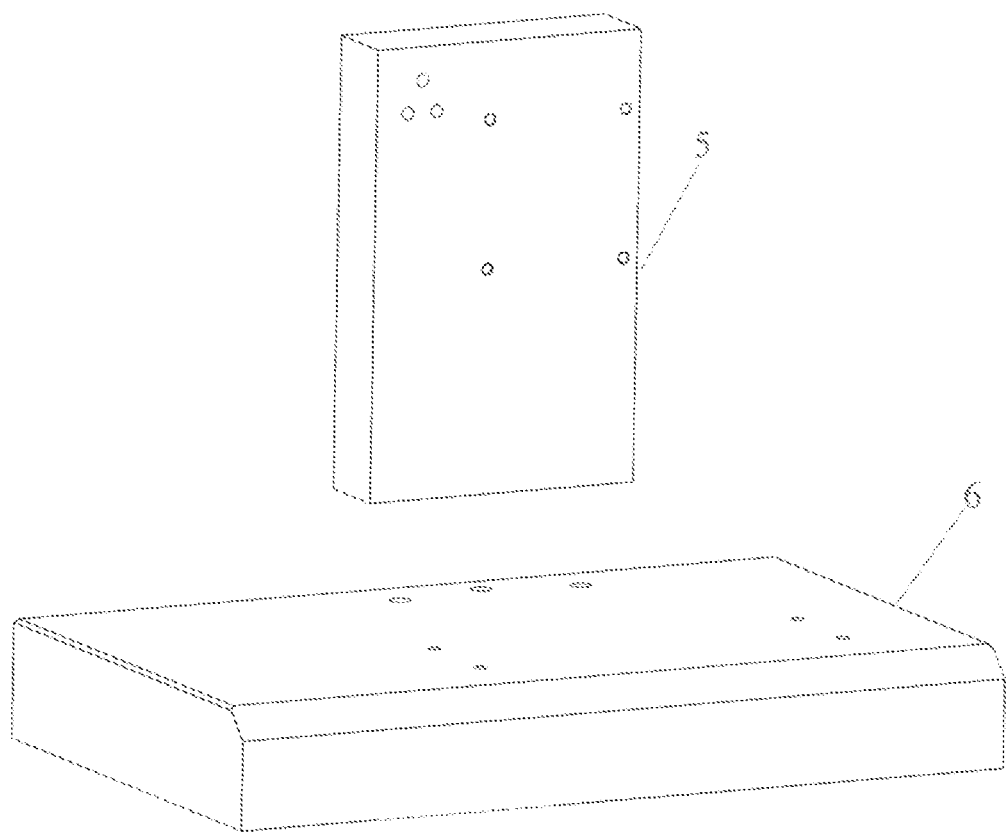
FIG. 4 is a structural diagram of a supporting component of the observable micro-nano mechanical testing apparatus.
Figure 5:
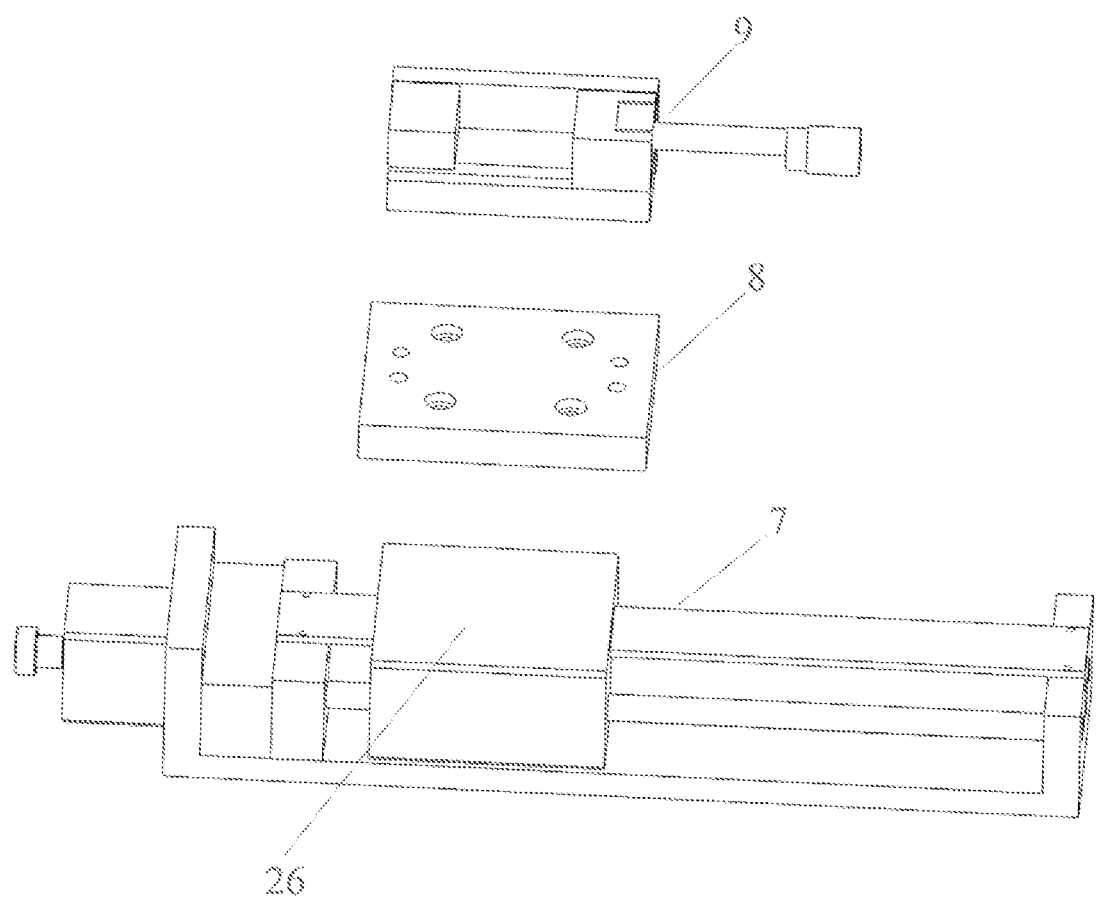
FIG. 5 is a structural diagram of a bearing component of the observable micro-nano mechanical testing apparatus.
Figure 6:
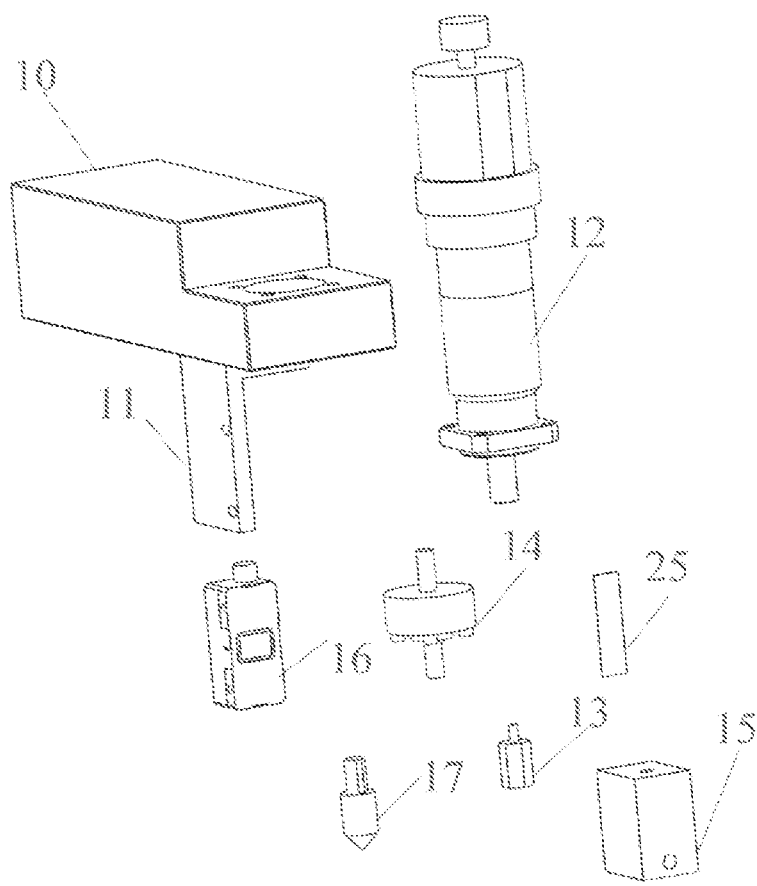
FIG. 6 is a structural diagram of a driving component of the observable micro-nano mechanical testing apparatus.
Figure 7:
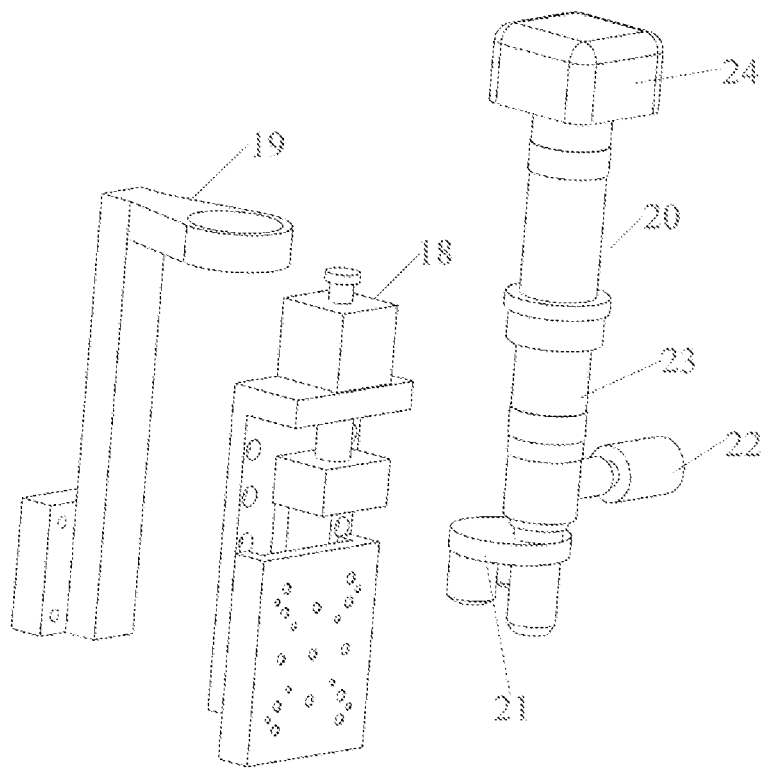
FIG. 7 is a structural diagram of an imaging component of the observable micro-nano mechanical testing apparatus.

List of reference numerals: 100 observable micro-nano mechanical testing apparatus; 1 supporting component; 2 driving component; 3 bearing component; 4 imaging component; 5 supporting backboard; 6 supporting bottom plate; 7 X-axis precise sliding table; 8 adapter plate; 9 clamping table; 10 cantilever beam; 11 grating fixing rack; 12 precise press-down apparatus; 13 adapter; 14 force sensor; 15 indenter fixture; 16 grating reading head; 17 indenter; 18 Z-axis sliding table; 19 microscope stand; 20 microscope; 21 objective lens; 22 point light source; 23 lens barrel; 24 camera; 25 grating ruler; 26 slide block.

DETAILED DESCRIPTION OF PREFERRED EMBODIMENTS

Technical solutions in embodiments of the present disclosure will be clearly and fully described below in combination with drawings in the embodiments of the present disclosure. Apparently, the described embodiments are merely a part of the embodiments of the present disclosure, rather than all the embodiments. Based on the embodiments in the present disclosure, all other embodiments obtained by those ordinarily skilled in the art without making creative labor shall fall within the protection scope of the present disclosure.

A purpose of the present disclosure is to provide an observable micro-nano mechanical testing apparatus and method, for solving problems existing in the prior art and effectively measuring mechanical property parameters of materials.

To make the above purpose, features and advantages of the present disclosure more obvious and understandable, the present disclosure will be further described in detail below in combination with the drawings and specific embodiments.

The present disclosure provides an observable micro-nano mechanical testing apparatus 100. As shown in FIGS. 1-9, the apparatus includes a supporting component 1, a driving component 2, a bearing component 3 and an imaging component 4. The driving component 2 and the imaging component 4 are respectively vertically arranged on the supporting component 1. The bearing component 3 is horizontally arranged on the supporting component 1 and positioned below the driving component 2 and the imaging component 4. The bearing component 3 is used for bearing a sample and moving the sample; the driving component 2 is used for driving an indenter to apply loads on the sample to form indentation on the sample; and the imaging component 4 is used for observing and analyzing the indentation on the sample.

In some embodiments, the supporting component 1 includes a supporting bottom plate 6 and a supporting backboard 5. The supporting bottom plate 6 is horizontally arranged, the supporting backboard 5 is fixedly vertically arranged on one side of a top of the supporting bottom plate 6. The supporting bottom plate 6 and the supporting backboard 5 are in threaded connection to be mainly used for supporting the driving component 2, the bearing component 3 and the imaging component 4. The driving component 2 and the imaging component 4 are arranged on the supporting backboard 5; and the bearing component 3 is arranged on the supporting bottom plate 6. The supporting bottom plate 6 is preferably made of granite. The granite is lighter than steel and heavier than aluminum, and is a commonly used material at present. The granite has major characteristics of being small in deformation, excellent in stability and resistant to rust. It is easy to perform the planner machining on the granite, and achieve flatness higher than that of cast iron. An internal damping coefficient of the granite is 15 times higher than that of the steel, and a damping effect of the granite is excellent. The granite is non-conducting and diamagnetic and avoids adhesion with metals or magnetization. The supporting backboard 5 is preferably made of steel so as to be easily machined have excellent bearing capacity, and effectively increase the weight, thereby increasing instrument stability. The bearing component 3 includes an X-axis precise sliding table 7. A slide block 26 is horizontally and slidably arranged on the X-axis precise sliding table 7, an adapter plate 8 is fixedly mounted on a top of the slide block 26, and a clamping table 9 is fixedly connected to a top of the adapter plate 8 and is used for clamping the sample. A bottom of the X-axis precise sliding table 7 is fixedly arranged on the supporting bottom plate 6. The driving component 2 includes a supporting module, a precise press-down apparatus 12, a load detection module and a displacement detection module. The supporting module includes a cantilever beam 10 and a grating fixing rack 11, and the grating fixing rack 11 is fixedly mounted on a lower part of the cantilever beam 10 arranged horizontally. The precise press-down apparatus 12 is fixedly connected to the cantilever beam 10, and an output shaft of the precise press-down apparatus 12 is vertically arranged downwards. The load detection module is in fixed threaded connection with a lower end of the output shaft of the precise press-down apparatus 12. The displacement detection module is fixedly connected to the grating fixing rack 11. A lower end of the load detection module is fixedly connected with an indenter fixture 15, the indenter fixture 15 is used for fixedly mounting an indenter 17. One end of the cantilever beam 10 is fixedly connected with the supporting backboard 5, the cantilever beam 10 is preferably made of steel which is high in bearing capacity and difficult to deform. A top of the cantilever beam is connected with a stepping motor by threads, and a bottom of the cantilever beam is connected with the grating fixing rack 11. The imaging component 4 includes a microscope, a microscope stand and a Z-axis sliding table 18. The microscope is fixed on a top of the microscope stand by set screws, one side of a bottom of the microscope stand is fixed on the Z-axis sliding table 18 by bolts; and the Z-axis sliding table 18 is fixed on the supporting backboard 5 by bolts. The Z-axis precision sliding table can drive the video microscope to complete focusing via the microscope stand.

Specifically, the precise press-down apparatus 12 is a linear stepping motor and fixedly connected to the cantilever beam 10 by bolts. The load detection module is a force sensor 14, a top of the force sensor 14 is connected with the precise press-down apparatus 12 by an adapter 13, and a bottom of the force sensor 14 is connected with the indenter fixture 15. The displacement detection module includes a grating ruler 25 and a grating reading head 16, slotted holes are formed in the grating fixing rack 11; the grating reading head is fixedly connected to the slotted holes of the grating fixing rack 11 by bolts. The grating ruler 25 is adhered onto the indenter fixture 15, and the grating ruler 25 and the grating reading head 16 are arranged opposite to each other, and the grating ruler 25 is parallel to the grating reading head 16 so as to adjust a distance between the grating reading head 16 and the grating ruler 25. The microscope 20 is a video microscope and includes an objective lens 21, a point light source 22, a lens barrel 23 and a camera 24. The objective lens 21 is of a turret structure and can conduct observation under different magnification, thereby realizing both high-magnification and large-view. An upper part of the lens barrel 23 is connected with the camera 24 by threads, a lower part of the lens barrel 23 is connected with the objective lens 21 by threads, the lower part of the lens barrel 23 is connected with the point light source 22 by set screws, and a middle part of the lens barrel 23 is fixed on the microscope stand 19 by set screws. The camera 24 can directly transmit an image formed by the objective lens 21 to a computer or other control systems for conducting real-time observation.

The present disclosure further provides a micro-nano mechanical testing method by using the above observable micro-nano mechanical testing apparatus. The testing method includes the following steps.

In step (1), the precise press-down apparatus 12 is connected with a computer, the load detection module and the displacement detection module are electrically connected with an analog-digital converter based acquisition card. The analog-digital converter based acquisition card is electrically connected with the computer, and an X-axis precise sliding table 7, a Z-axis precise sliding table and a microscope are respectively electrically connected with the computer.

In step (2), the indenter 17 is mounted on the indenter fixture 15, the sample is fixed on the bearing component 3, and the X-axis precise sliding table 7 is driven by the computer to locate the sample directly under the indenter 17.

In step (3), parameters of the tested sample and indenter, including a Poisson's ratio of material of the tested sample, a thickness of the material of the tested sample, a thickness of a thin film sample, a type of the indenter 17 and material parameters of the indenter 17, are set by the computer. A load control manner or a displacement control manner is selected as a test loading mode. Corresponding control parameters are set as a maximum load value loaded or a maximum displacement value loaded. A loading time, load maintaining time and unloading time are input to start an indentation test.

In step (4), during pressing the indenter, it is determined that the indenter 17 is contacted with the sample when the load detection module detects a minimum value of a response force; and then the indentation test is implemented according to the set control parameters and the loading time, load maintaining time and unloading time.

In step (5), load and displacement signals are acquired during the test by the analog-digital converter based acquisition card. The load and displacement signals are converted into load and displacement values, and the values are presented on a computer software interface as load-displacement curves in the test process, wherein the load-displacement curves included a load-displacement curve in a loading process and a load-displacement curve in an unloading process.

Figure 8:
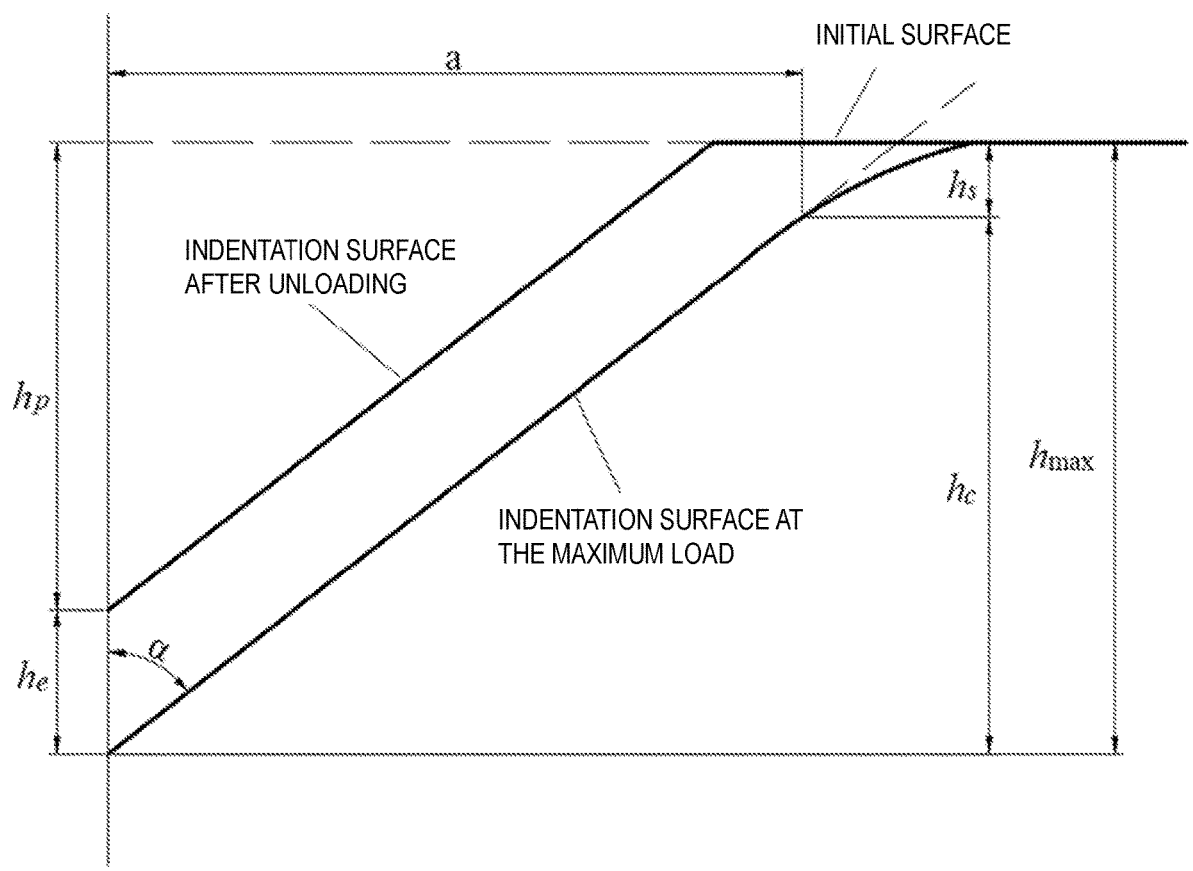
FIG. 8 is a structural diagram of loading and unloading cross sections with an observation method in the present disclosure.
Figure 9:
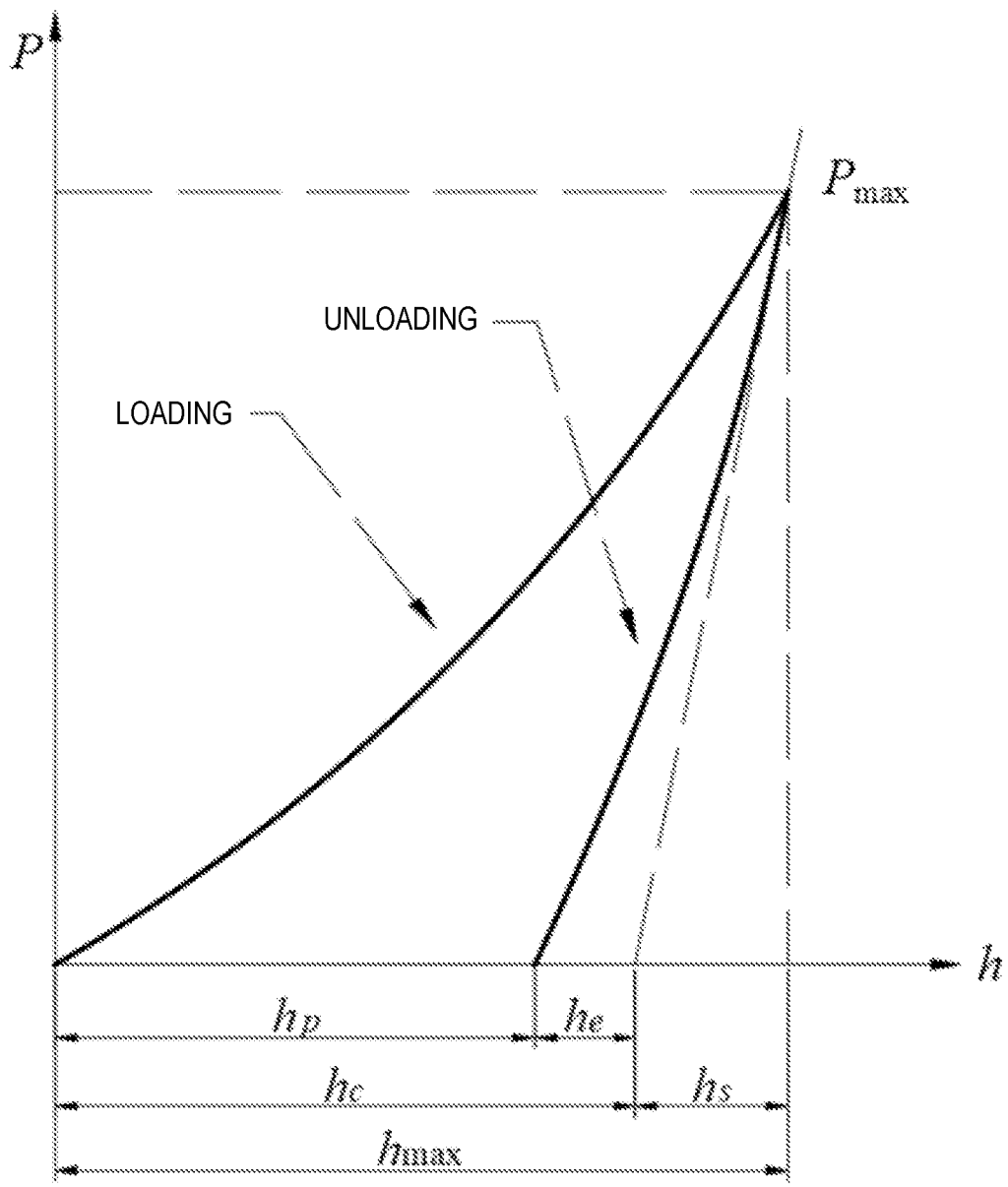
FIG. 9 is a load-displacement curve chart of the observation method in the present disclosure.

In step (6), the X-axis precise sliding table 7 is controlled by the computer to move the sample to a position under the microscope, and the Z-axis precise sliding table is controlled by the computer to transfer the microscope to a focus so as to start observing the sample. Data observed is transmitted to the computer. FIG. 8 shows a schematic diagram of contrast of an indentation surface after unloading, an indentation surface at the maximum load and an initial surface, and FIG. 9 shows load-displacement curve charts in the loading and unloading processes.

Optionally, in step (5), a loading segment and an unloading segment in the load-displacement curve are represented by two fitting expressions as follows:

$$P=Ch^2 \qquad (1)$$

$$P=B(h-h_p)^m \qquad (2)$$

In the expressions (1) and (2), P is an indentation load; C, B and m all are fitted values; for the data of the unloading segment, the instrument developed and researched in the present disclosure performs fitting by using 20-60% of the data of the unloading segment, so as to obtain an expression of the unloading segment with excellent correlation; and contact stiffness of the material is a slope of the indentation while the maximum load is reached, i.e., $$S = \left(\frac{dP}{dh}\right)_{P_{max}} = mB(h-h_p)^{m-1}. \qquad (3)$$

Contact depth $h_c$ of the material can be used for calculating a contact area of the indenter which is expressed as follows:

$$h_c = h_{max} - \varepsilon \frac{P_{max}}{S}. \qquad (4)$$

In the expression (4), ε is a shape factor of the indenter, for a Berkovich indenter, a Vickers indenter and a spherical indenter, ε is 0.75, while for Rockwell conical indenter, ε is 0.72, and for a flat indenter, ε is 1. According to the traditional elastic-plastic theory, hardness is a parameter of the material which represents an ability of the material to resist a pressing from a hard object, and is expressed as follows:

$$H = \frac{P_{max}}{A_c}. \qquad (5)$$

In the expression (5), $A_c$ is an actual contact area of the indenter, the $A_c$ is one of the most important factors influencing testing accuracy of the test, and is expressed as follows:

$$A(h_c) = \sum_{i=0}^{n} C_i h_c^{\frac{1}{2^{i-1}}}. \qquad (6)$$

In the expression (6), $C_i$ is a fitting parameter and can be obtained by test. A area function designed for the Rockwell, Berkovich and Vickers indenters is $A=24.5\ h^2$. To calculate elasticity modulus of the material, a contact projection area of the indenter and the contact stiffness of the material shall be introduced, and is expressed as follows:

$$S = \beta \frac{2}{\sqrt{\pi}} E_r \sqrt{A_c} \qquad (7)$$

In the expression (7), β is a morphology parameter of the indenter, for the Berkovich and Vickers indenters, β is 1.034 and 1.012 respectively, and when the indenter is a circular indenter, β is 1. $E_r$ is converted modulus; and the converted modulus is determined by the elasticity modulus and a Poisson's ratio of the material and an elasticity modulus and a Poisson's ratio of the indenter:

$$\frac{1}{E_r} = \frac{1-v^2}{E} + \frac{v_i^2}{E_i} \quad (8)$$

In the expression (8), E is the elasticity modulus of the material of the sample to be tested; v is the Poisson's ratio of the material of tested sample; $E_i$ is the elasticity modulus of the indenter; $v_i$ is the Poisson's ratio of the indenter; the indenter is generally made of diamond, and the elasticity modulus and the Poisson's ratio of the indenter is respectively 1141 GPa and 0.07. The elasticity modulus of the tested material can be obtained by the above expression, and is expressed as follows:

$$E = \frac{1-v^2}{\frac{1}{E_r} - \frac{1-v_i^2}{E_i}} \quad (10)$$

Then, the hardness and the elasticity modulus of the material can be obtained.

Optionally, in step (6), a fracture half-length c of a thin-film material is recorded; and residual stress and fracture toughness of the thin-film material can be calculated as follows:

$$K_{IC}^{sur} = K_P + K_r = \chi \frac{P}{c^{3/2}} + \frac{4}{\sqrt{\pi}}\sigma_r h_t^{1/2} - \frac{2}{\sqrt{\pi}}\sigma_r h_t / c^{1/2}. \quad (11)$$

Where, $K_{IC}^{sur}$ represents a surface fracture toughness, with an unit of GPa $\sqrt{\mu m}$; $\sigma_r$ represents residual stress, with an unit of GPa; P represents indentation load, with an unit of mN; c represents fracture half-length, with an unit of μm; $h_t$ represents thickness of the thin-film material, with an unit of μm; $K_p$ represents a stress intensity factor at the time of loading the indenter; $K_r$ represents a residual stress at the time of unloading the indenter; and χ represents a constant related to properties of the indenter and thin-film material.

Through deforming the above expression, the following expression can be obtained:

$$\frac{P}{c^{3/2}} = \frac{K_{IC}^{sur} - \frac{4}{\sqrt{\pi}}\sigma_r h_t^{1/2}}{\chi} + \frac{2}{\chi\sqrt{\pi}}\sigma_r h_t c^{-1/2} \quad (12)$$

By considering $$\frac{P}{c^{3/2}}$$

as a function of $c^{-1/2}$, slope and intercept of a linear fitting equation are obtained by a linear fitting method. In the expression, $$\chi = \delta\left(\frac{E}{H}\right)^{1/2},$$

where δ is a parameter related to a geometrical shape of the indenter, and for the Vickers indenters, δ is 0.016; E and H are respectively Young modulus and hardness of the thin-film material;

$$\left(K_{IC}^{sur} - \frac{4}{\sqrt{\pi}}\sigma_r h_t^{1/2}\right)/\chi$$

is the intercept of the linear fitting equation; and $$\frac{2}{\sqrt{\pi}\chi}\sigma_r h_t$$

is the slope of the linear luting equation. When the thickness of the thin-film material is known, the residual stress of the material can be obtained by the slope, and then the residual stress is substituted into the intercept expression so as to obtain the surface fracture toughness of the thin-film material.

$$K_{IC}^{int} = K_P + K_r = \chi\frac{P}{c^{3/2}} + \frac{4}{\sqrt{\pi}}\sigma_r c^{1/2} - \frac{2}{\sqrt{\pi}}\sigma_r c^{\frac{1}{2}} = \chi\frac{P}{c^{3/2}} + \frac{2}{\sqrt{\pi}}\sigma_r c^{1/2} \quad (13)$$

In the expression (13), $K_{IC}^{int}$ represents an interfacial fracture toughness with an unit of GPa $\sqrt{\mu m}$; $\sigma_r$ represents a residual stress with an unit of GPa; P represents an indentation load with an unit of mN; c represents fracture half-length with an unit of μm; and χ represents a constant related to the properties of the indenter and thin-film material.

Through conversion, an expression is obtained as follows:

$$\frac{P}{c^{3/2}} = \frac{K_{IC}^{int}}{\chi} - \frac{2}{\sqrt{\pi}\chi}c^{1/2} \quad (14)$$

By considering $$\frac{P}{c^{3/2}}$$

as a function of $c^{1/2}$, slope and intercept of the linear fitting equation are obtained by a linear fitting method. In the expression, $$\chi = \delta\left(\frac{E}{H}\right)^{1/2};$$

δ is a parameter related to the geometrical shape of the indenter; for the Vickers indenter, δ is 0.016; E and H are respectively Young modulus and hardness of the thin-film material;

$$\frac{K_{IC}^{int}}{\chi}$$

is the intercept of the linear fitting equation; and $$\frac{2\sigma_r}{\sqrt{\pi}\,\chi}$$

is the slope of the linear fitting equation. Then, the residual stress and the interfacial fracture toughness can be obtained.

In the present disclosure, principles and embodiments of the present disclosure are described by specific examples. Descriptions in the above embodiments are merely used for helping understand the method in the present disclosure and its core concept. Meanwhile, modifications may be made to the specific embodiments and the application scopes by those general skilled in the art according to the concept of the present disclosure. In summary, the contents in the description shall not be understood as a limitation to the present disclosure.

What is claimed is:

1. An observable micro-nano mechanical testing apparatus, comprising:
   a supporting component;
   a driving component;
   a bearing component; and
   an imaging component;
   wherein the driving component and the imaging component are respectively vertically arranged on the supporting component, the bearing component is horizontally arranged on the supporting component and positioned below the driving component and the imaging component, the bearing component is used for bearing a sample and moving the sample, the driving component is used for driving an indenter to apply loads on the sample so as to form an indentation on the sample, and the imaging component is used for observing and analyzing the indentation on the sample;
   wherein the supporting component comprises a supporting bottom plate and a supporting backboard, the supporting bottom plate is horizontally arranged, the supporting backboard is fixedly vertically arranged on one side of a top of the supporting bottom plate, the driving component and the imaging component are arranged on the supporting backboard, and the bearing component is arranged on the supporting bottom plate;
   wherein the driving component comprises a supporting module, a precise press-down apparatus, a load detection module and a displacement detection module, the supporting module comprises a cantilever beam and a grating fixing rack, the grating fixing rack is fixedly mounted on a lower part of the cantilever beam horizontally arranged, the precise press-down apparatus is fixedly connected to the cantilever beam, and an output shaft of the precise press-down apparatus is vertically arranged downwards, the load detection module is fixedly and threadedly connected with a lower end of the output shaft of the precise press-down apparatus, the displacement detection module is fixedly connected to the grating fixing rack, a lower end of the load detection module is fixedly connected with an indenter fixture, the indenter fixture is used for fixedly mounting an indenter, and one end of the cantilever beam is fixedly connected with the supporting backboard.

2. The apparatus according to claim 1, wherein the bearing component comprises an X-axis precise sliding table, a slide block is horizontally and slidably arranged on the X-axis precise sliding table, an adapter plate is fixedly mounted on a top of the slide block, a clamping table is fixedly connected to a top of the adapter plate and is used for clamping the sample, and a bottom of the X-axis precise sliding table is fixedly arranged on the supporting bottom plate.

3. The apparatus according to claim 1, wherein the imaging component comprises a microscope, a microscope stand and a Z-axis sliding table, the microscope is fixed on a top of the microscope stand by set screws, one side of a bottom of the microscope stand is fixed on the Z-axis sliding table by bolts, and the Z-axis sliding table is fixed on the supporting backboard by bolts.

4. The apparatus according to claim 3, wherein the microscope comprises an objective lens, a point light source, a lens barrel and a camera, the objective lens is of a turret structure, an upper part of the lens barrel is connected with the camera by threads, a lower part of the lens barrel is connected with the objective lens by threads, the lower part of the lens barrel is connected with the point light source by set screws, a middle part of the lens barrel is fixed on the microscope stand by set screws, and the camera can directly transmit an image formed by the objective lens to a control system for conducting real-time observation.

5. The apparatus according to claim 1, wherein the precise press-down apparatus is a linear stepping motor and fixedly connected to the cantilever beam by bolts, the load detection module is a force sensor, a top of the force sensor is connected with the precise press-down apparatus by an adapter, a bottom of the force sensor is connected with the indenter fixture, the displacement detection module comprises a grating ruler and a grating reading head, slotted holes are formed in the grating fixing rack, the grating reading head is fixedly connected to the slotted holes of the grating fixing rack by bolts, the grating ruler is adhered to the indenter fixture, and the grating ruler and the grating reading head are arranged opposite to each other, and the grating ruler is parallel to the grating reading head.

6. An observable micro-nano mechanical testing method using an observable micro-nano mechanical testing apparatus, which comprises a supporting component, a driving component, a bearing component and an imaging component, wherein the driving component and the imaging component are respectively vertically arranged on the supporting component, the bearing component is horizontally arranged on the supporting component and positioned below the driving component and the imaging component, the bearing component is used for bearing a sample and moving the sample, the driving component is used for driving an indenter to apply loads on the sample so as to form an indentation on the sample, and the imaging component is used for observing and analyzing the indentation on the sample, the method comprising:
   connecting a precise press-down apparatus with a computer; electrically connecting a load detection module and a displacement detection module with an analog-digital converter based acquisition card; electrically connecting the analog-digital converter based acquisition card with the computer; and electrically connecting an X-axis precise sliding table, a Z-axis precise sliding table and a microscope with the computer;
   mounting an indenter on an indenter fixture; fixing the sample on the bearing component; and driving the X-axis precise sliding table by the computer to locate the sample directly under the indenter;

setting one or more parameters of the sample to be tested and the indenter by the computer; selecting a test loading mode; inputting a loading time, a load maintaining time and a unloading time; and starting an indentation test;

determining that the indenter is contacted with the sample when the load detection module detects a minimum value of a response force during pressing the indenter, and implementing the indentation test according to predetermined control parameters and the loading time, the load maintaining time and the unloading time;

acquiring load and displacement signals during the indentation test by the analog-digital converter based acquisition card; converting the load and displacement signals into load and displacement values; and presenting the load and displacement values on a computer software interface so as to obtain load-displacement curves in the test process, wherein the load-displacement curves comprise a load-displacement curve in a loading process and a load-displacement curve in an unloading process; and controlling the X-axis precise sliding table by the computer to move the sample to a position under the microscope; controlling the Z-axis precise sliding table by the computer to transfer the microscope to a focus; starting to observe the sample; and transmitting data observed to the computer.

7. The method according to claim 6, wherein the supporting component comprises a supporting bottom plate and a supporting backboard, the supporting bottom plate is horizontally arranged, the supporting backboard is fixedly vertically arranged on one side of a top of the supporting bottom plate, the driving component and the imaging component are arranged on the supporting backboard, and the bearing component is arranged on the supporting bottom plate.

8. The method according to claim 7, wherein the bearing component comprises an X-axis precise sliding table, a slide block is horizontally and slidably arranged on the X-axis precise sliding table, an adapter plate is fixedly mounted on a top of the slide block, a clamping table is fixedly connected to a top of the adapter plate and is used for clamping the sample, and a bottom of the X-axis precise sliding table is fixedly arranged on the supporting bottom plate.

9. The method according to claim 7, wherein the driving component comprises a supporting module, a precise press-down apparatus, a load detection module and a displacement detection module, the supporting module comprises a cantilever beam and a grating fixing rack, the grating fixing rack is fixedly mounted on a lower part of the cantilever beam horizontally arranged, the precise press-down apparatus is fixedly connected to the cantilever beam, and an output shaft of the precise press-down apparatus is vertically arranged downwards, the load detection module is fixedly and threadedly connected with a lower end of the output shaft of the precise press-down apparatus, the displacement detection module is fixedly connected to the grating fixing rack, a lower end of the load detection module is fixedly connected with an indenter fixture, the indenter fixture is used for fixedly mounting an indenter, and one end of the cantilever beam is fixedly connected with the supporting backboard.

10. The method according to claim 9, wherein the precise press-down apparatus is a linear stepping motor and fixedly connected to the cantilever beam by bolts, the load detection module is a force sensor, a top of the force sensor is connected with the precise press-down apparatus by an adapter, a bottom of the force sensor is connected with the indenter fixture, the displacement detection module comprises a grating ruler and a grating reading head, slotted holes are formed in the grating fixing rack, the grating reading head is fixedly connected to the slotted holes of the grating fixing rack by bolts, the grating ruler is adhered to the indenter fixture, and the grating ruler and the grating reading head are arranged opposite to each other, and the grating ruler is parallel to the grating reading head.

11. The method according to claim 7, wherein the imaging component comprises a microscope, a microscope stand and a Z-axis sliding table, the microscope is fixed on a top of the microscope stand by set screws, one side of a bottom of the microscope stand is fixed on the Z-axis sliding table by bolts, and the Z-axis sliding table is fixed on the supporting backboard by bolts.

12. The method according to claim 11, wherein the microscope comprises an objective lens, a point light source, a lens barrel and a camera, the objective lens is of a turret structure, an upper part of the lens barrel is connected with the camera by threads, a lower part of the lens barrel is connected with the objective lens by threads, the lower part of the lens barrel is connected with the point light source by set screws, a middle part of the lens barrel is fixed on the microscope stand by set screws, and the camera can directly transmit an image formed by the objective lens to a control system for conducting real-time observation.

13. The method according to claim 6, wherein in the acquiring step, a loading segment and an unloading segment in the load-displacement curve are represented by two fitting expressions (1) and (2) as follows:

$$P=Ch^2 \quad (1)$$

$$P=B(h-h_p)^m, \quad (2)$$

where in expressions (1) and (2), P is a indentation load; C, B and m all are fitted values; and a contact stiffness S of a material of the sample is a slope of the indentation while a maximum load is reached, and is expressed as:

$$S = \left(\frac{dP}{dh}\right)_{P_{max}} = mB(h-h_p)^{m-1}, \quad (3)$$

contact depth $h_c$ of the material can be used for calculating a contact area of the indenter which is expressed as follows:

$$h_c = h_{max} - \varepsilon \frac{P_{max}}{S}, \quad (4)$$

where in expression (4), $\varepsilon$ is a shape factor of the indenter; a hardness H is a parameter of the material which represents an ability of the material to resist a pressing from a hard object; and is expressed as follows:

$$H = \frac{P_{max}}{A_c}, \quad (5)$$

where in expression (5), $A_c$ is an actual contact area of the indenter, which is expressed as:

$$A(h_c) = \sum_{i=0}^{n} C_i h_c^{\frac{1}{2^{i-1}}}, \quad (6)$$

where $C_i$ is a fitting parameter;

wherein in order to calculate elasticity modulus of the material, a relationship between a contact projection area of the indenters and the contact stiffness S of the material is determined as follows:

$$S = \beta \frac{2}{\sqrt{\pi}} E_r \sqrt{A_c}, \quad (7)$$

where in expression (7), β is a morphology parameter of the indenter, $E_r$ is converted modulus, and the converted modulus is determined by the elasticity modulus and a Poisson's ratio of the material and an elasticity modulus and a Poisson's ratio of the indenter:

$$\frac{1}{E_r} = \frac{1-v^2}{E} + \frac{v_i^2}{E_i}, \quad (8)$$

where in expression (8), E is the elasticity modulus of the material tested, v is the Poisson's ratio of the material tested, $E_i$ is the elasticity modulus of the indenter, $v_i$ is the Poisson's ratio of the indenter; and the elasticity modulus of the material tested is obtained by the expression (8), and is expressed as follows:

$$E = \frac{1-v^2}{\frac{1}{E_r} - \frac{1-v_i^2}{E_i}} \quad (10)$$

whereby the hardness and the elasticity modulus of the material is obtained.

14. The method according to claim 13, wherein in the observing step, a fracture half-length c of a thin-film material is recorded, and residual stress and fracture toughness of the thin-film material is calculated as follows:

$$K_{IC}^{sur} = K_P + K_r = \chi \frac{P}{c^{3/2}} + \frac{4}{\sqrt{\pi}} \sigma_r h_t^{1/2} - \frac{2}{\sqrt{\pi}} \sigma_r h_t/c^{1/2}, \quad (11)$$

where in expression (11), $K_{IC}^{sur}$ represents surface fracture toughness with an unit of GPa $\sqrt{\mu m}$, $\sigma_r$ represents residual stress with an unit of GPa, P represents indentation load with an unit of mN, c represents fracture half-length with an unit of μm, $h_t$ represents thickness of the thin-film material with an unit of μm, $K_p$ represents a stress intensity factor at the time of loading the indenter, $K_r$ represents a residual stress at the time of unloading the indenter, and χ represents a constant related to properties of the indenter and thin-film material;

wherein through deforming the expression (11), following expression is obtained:

$$\frac{P}{c^{3/2}} + \frac{K_{IC}^{sur} - \frac{4}{\sqrt{\pi}} \sigma_r h_t^{1/2}}{\chi} + \frac{2}{\chi\sqrt{\pi}} \sigma_r h_t c^{-1/2}, \quad (12)$$

where by considering $$\frac{P}{c^{3/2}}$$

as a function of $c^{-1/2}$ slope and intercept of the expression (12) are obtained by a linear fitting method; in expression (12), $$\chi = \delta \left(\frac{E}{H}\right)^{1/2},$$

where δ is a parameter related to a geometrical shape of the indenter, E and H are respectively Young modulus and hardness of the thin-film material, $$\left(K_{IC}^{sur} - \frac{4}{\sqrt{\pi}} \sigma_r h_t^{1/2}\right)/\chi$$

is the intercept of the expression (12)

$$\frac{2}{\chi\sqrt{\pi}} \sigma_r h_t$$

is the slope of the expression (12); and when the thickness of the thin-film material is known, the residual stress of the material is obtained by the slope, and the residual stress is substituted into the intercept so as to obtain a surface fracture toughness of the thin-film material;

$$K_{IC}^{int} = \quad (13)$$
$$K_P + K_r = \chi \frac{P}{c^{3/2}} + \frac{4}{\sqrt{\pi}} \sigma_r c^{1/2} - \frac{2}{\sqrt{\pi}} \sigma_r c^{\frac{1}{2}} = \chi \frac{P}{c^{3/2}} + \frac{2}{\sqrt{\pi}} \sigma_r c^{1/2},$$

where in expression (13), $K_{IC}^{int}$ represents an interfacial fracture toughness, with an unit of GPa $\sqrt{\mu m}$, $\sigma_r$ represents the residual stress with the unit of GPa, P represents the indentation load with the unit of mN, c represents the fracture half-length with the unit of μm, and χ represents the constant related to the properties of the indenter and the thin-film material;

wherein through conversion, an expression is obtained as follows:

$$\frac{P}{c^{3/2}} = \frac{K_{IC}^{int}}{\chi} - \frac{2\sigma_r}{\sqrt{\pi}\chi} c^{1/2} \quad (14)$$

by considering $$\frac{P}{c^{3/2}}$$

as a function of $c^{1/2}$, slope and intercept of the expression (14) are obtained by a linear fitting method; where in expression (14), $$\chi = \delta\left(\frac{E}{H}\right)^{1/2},$$

where $\delta$ is a parameter related to the geometrical shape of the indenter; E and H are respectively the Young modulus and the hardness of the thin-film material, $$\frac{K_{IC}^{int}}{\chi}$$

is the intercept of the linear fitting equation, $$\frac{2\sigma_r}{\sqrt{\pi}\,\chi}$$

is the slope of the expression (14) and the residual stress and the interfacial fracture toughness is obtained.

\* \* \* \* \*